US006982927B2

(12) United States Patent
Taner

(10) Patent No.: US 6,982,927 B2
(45) Date of Patent: Jan. 3, 2006

(54) METHOD FOR PROCESSING SEISMIC DATA TO IDENTIFY ANOMALOUS ABSORPTION ZONES

(75) Inventor: M. Turhan Taner, Houston, TX (US)

(73) Assignee: RDSP I, L.P., Houston, TX (US)

( * ) Notice: Subject to any disclaimer, the term of this patent is extended or adjusted under 35 U.S.C. 154(b) by 201 days.

(21) Appl. No.: 10/670,110

(22) Filed: Sep. 24, 2003

(65) Prior Publication Data
US 2005/0075790 A1  Apr. 7, 2005

(51) Int. Cl.
*G01V 1/30* (2006.01)
(52) U.S. Cl. .............................. 367/49; 367/38; 367/73
(58) Field of Classification Search .................. 367/38, 367/49, 73; 702/17
See application file for complete search history.

(56) References Cited

U.S. PATENT DOCUMENTS

| | | | | |
|---|---|---|---|---|
| 4,694,438 A | * | 9/1987 | Sengupta ....................... | 367/70 |
| 5,136,552 A | * | 8/1992 | Kelly et al. ..................... | 367/47 |
| 5,724,309 A | | 3/1998 | Higgs et al. | |
| 5,740,036 A | * | 4/1998 | Ahuja et al. ................... | 702/17 |
| 5,798,982 A | * | 8/1998 | He et al. ....................... | 367/73 |
| 5,808,966 A | * | 9/1998 | Calvert et al. ................. | 367/73 |
| 2002/0042702 A1 | * | 4/2002 | Calvert et al. ................. | 703/10 |

OTHER PUBLICATIONS

Lance, J. O. "Frequency Domain Analysis of Least Squares Polynomial Surfaces With Application to Gravity Data in the Pedregosa Basin Area." Abstract Only. Texas Univ. El Paso, Thesis, Jun. 1983.*
Ma, Xin-Quan. "A constrained global inversion method using an overparameterized scheme: Application to poststack seismic data." Geophysics, vol. 66 No. 2. Mar.-Apr. 2001.*
Thurston and Brown. "The Filtering Characteristics of Least-Squares Polynomial Approximation for Regional/Residual Separation." Canadian Journal of Exploration Geophysics, vol. 28, No. 2. Dec. 1992.*
Tobback, et al. "Decomposition of seismic signals via time-frequency representations," SEG, 1996.*
Taner, M., "Joint Time/Frequency Analysis, Q Quality Factor and Dispersion Computation Using Gabor-Morlet Wavelets or the Gabor- Morlet Trans.", Rock Solid Images, Jan. 2002.
Fatti, J. et al., "Detection of gas in sandstone reservoirs using AVO analysis. A 3-D seismic case history using the Geostack technique", Geophysics v. 59, No. 9, Sep. 1994.

* cited by examiner

*Primary Examiner*—Jack Keith
*Assistant Examiner*—Scott A. Hughes
(74) *Attorney, Agent, or Firm*—Richard A. Fagin

(57) ABSTRACT

A method is disclosed for identifying zones anomalously absorptive of seismic energy. The method includes jointly time-frequency decomposing seismic traces, low frequency bandpass filtering the decomposed traces to determine a general trend of mean frequency and bandwidth of the seismic traces, and high frequency bandpass filtering the decomposed traces to determine local variations in the mean frequency and bandwidth of the seismic traces. Anomalous zones are determined where there is difference between the general trend and the local variations.

20 Claims, 2 Drawing Sheets

METHOD FOR PROCESSING SEISMIC DATA TO IDENTIFY ANOMALOUS ABSORPTION ZONES

STATEMENT REGARDING FEDERALLY SPONSORED RESEARCH OR DEVELOPMENT

The present invention was made pursuant to contract number DE-FC26-01BC15356 with the United States Department of Energy. The United States Government retains certain rights in the invention.

CROSS-REFERENCE TO RELATED APPLICATIONS

Not applicable.

BACKGROUND OF THE INVENTION

1. Field of the Invention

The invention relates generally to the field of seismic data processing. More specifically, the invention related to methods for identifying economically useful earth formations directly from processed seismic data.

2. Background Art

Seismic exploration techniques are used to locate subsurface earth formations that are likely to produce economically useful materials such as petroleum. Seismic exploration techniques include deploying one or more seismic energy sources near the earth's surface and deploying an array of seismic sensors at or near the surface in the vicinity of the one or more seismic sources. Seismic energy propagates downwardly from the source, where it may be reflected by subsurface acoustic impedance boundaries. The reflected seismic energy is detected by the sensors in the array. The sensors generate electrical and/or optical signals corresponding to the detected seismic energy. The signals are typically recorded for processing.

Seismic processing known in the art includes determining structures of the subsurface earth formations. Typically, structures are inferred by analysis of the two-way travel time of the seismic energy from the source to the various reflective boundaries beneath the surface and back to the sensors at or near the surface.

It is also known in the art to determine various petrophysical properties of the subsurface earth formations by analysis of the frequency content of the detected seismic energy and the phase and amplitude relationships between the seismic energy generated by the source and the seismic energy detected by the sensors. Such analysis includes determining one or more seismic "attributes" of the earth formations. Attributes may be computed prestack or poststack. Prestack means processing prior to summing or "stacking" individual sensor recordings ("traces") according to a predetermined relationship, such as common mid point (CMP) or common depth point (CDP). Poststack refers to processing after individual sensor recordings have been summed or stacked. Poststack attributes include, for example, reflection intensity, instantaneous frequency, reflection heterogeneity, acoustic impedance, velocity, dip, depth and azimuth. Prestack attributes include moveout parameters such as amplitude-versus-offset (AVO), and interval and average velocities. Further, attributes may be categorized as either instantaneous attributes, wavelet attributes or geometrical attributes. Instantaneous attributes are attributes whose values are obtained for each data point in the seismic data or within a small time window of data points (e.g., a few milliseconds), such as amplitude, phase, frequency and power. "Data points" within seismic data typically refers to numbers each representing a value of seismic signal amplitude at the instant in time at which each of the amplitude values is recorded. Wavelet attributes are the instantaneous attributes computed at the maximum point of the envelope. The physical meaning of all the wavelet attributes is essentially the same as their instantaneous attribute counterparts. Geometrical, or interval, attributes are attributes of a seismic trace within a seismic interval which are computed from the reflection configuration and continuity. The following references describe aspects of seismic attributes and their applications.

U.S. Pat. No. 5,226,019 issued to Bahorich states that with reference to seismic attributes, "combining multiple (i.e. two or more) descriptors through addition, subtraction, multiplication and ratio, or other means can also be successfully employed", and suggests the use of "a product of the average instantaneous amplitude and average instantaneous frequency."

U.S. Pat. No. 5,884,229 issued to Matteucci, discloses a statistical method for quantitatively measuring the lateral continuity of the seismic reflection character of any specified location in a subsurface target formation.

U.S. Pat. No. 5,930,730 issued to Marfurt et al., discloses a system for forming a seismic attribute display from calculated measures of semblance and corresponding estimates of true dip and true dip azimuth of seismic traces within an analysis cell.

U.S. Pat. No. 6,012,018 issued to Hornbuckle, relates to a system for identifying volumetric subterranean regions bounded by a surface in which a specific seismic characteristic has a constant value. It is stated in the '018 patent that, "in a geological region where physical characteristics (e.g., the presence of oil or gas) are well-correlated with seismic attributes, (e.g., seismic amplitude data), the identification of a subvolume bounded by a constant-seismic-attribute-value surface may provide a very useful predictor of the volumetric extent of the attribute and hence of the characteristic."

U.S. Pat. No. 5,001,677 issued to Masters, discloses a system which treats measured attributes derived from seismic data as components of a vector, estimates a background vector representing typical background geologic strata, and then calculates a new attribute. As stated in the '677 patent, the preferred embodiment combines information about P (compressional) and S (shear) impedance contrasts so as to discriminate prospective reservoir strata from surrounding non-reservoir or background strata.

U.S. Pat. No. 5,724,309 issued to Higgs et al, discloses a system in which two new seismic attributes (dip magnitude and dip azimuth) are derived from instantaneous phase. The system comprises determining a spatial frequency value by taking the directional spatial derivative of the instantaneous phase for each of a plurality of x, y, t(z) data points in the seismic data and posting the spatial frequency values to identify changes within the earth's subsurface.

U.S. Pat. No. 5,870,691 issued to Partyka et al., discloses a method for processing seismic data to identify thin beds. Although it is generally recognized that specific seismic attributes are related to specific subsurface properties, a need continues to exist for advancements in the use of seismic attributes to improve the delineation of subsurface regions of the earth to assist in the exploration and production of oil, natural gas and other minerals. There is continuing interest in methods for analyzing seismic data so as to provide direct indication of the presence of petroleum beneath the earth's surface.

SUMMARY OF THE INVENTION

One aspect of the invention is a method for identifying zones anomalously absorptive of seismic energy. The method includes joint time-frequency decomposing seismic traces. The decomposed traces are low frequency bandpass filtered to determine a general trend of mean frequency and bandwidth of the seismic traces. The decomposed traces are then high frequency bandpass filtered to determine local variations in the mean frequency and bandwidth of the seismic traces. Anomalous absorption zones are determined where there is difference between the general trend and the local variations.

In one embodiment of the method, the decomposition includes Gabor-Morlet decomposition. In one embodiment, the bandpass filtering includes averaging over a selected length time window. In a preferred embodiment, the decomposed traces are normalized by matching the envelope of the decomposed traces to the envelope of the originally recorded traces.

In a specific embodiment, the decomposed traces are spectrally balanced, and a set of relative acoustic impedances is determined using inversion processing. A product of the anomalous absorption indication and the relative acoustic impedance is used to determine hybrid attributes.

Another aspect of the invention is computer program stored in a computer readable medium. The program includes logic operable to cause a programmable computer to perform the following. First, joint time-frequency decomposing seismic traces is performed. The decomposed traces are then low frequency bandpass filtering to determine a general trend of mean frequency and bandwidth of the seismic traces. The decomposed traces are then high frequency bandpass filtered to determine local variations in the mean frequency and bandwidth of the seismic traces, whereby anomalously absorptive zones are determined when the local variations deviate from the general trend.

Other aspects and advantages of the invention will be apparent from the following description and the appended claims.

DETAILED DESCRIPTION

It is known in the art that as seismic energy propagates through earth formations, higher frequency components in the seismic energy lose the same fractional amount of energy per cycle as do lower frequency components of the seismic energy. However, the higher frequency components lose more energy over the same travel distance as do lower frequency seismic energy components. This results in a shift in the spectral content of the seismic energy to lower frequencies, as well as narrowing the bandwidth of the seismic energy, as the seismic energy propagates through the earth formations. If all earth formations were homogenous, the energy loss could be expressed in the form of a monotonic exponential relationship. Any variation of the acoustic properties of the various formations within the earth will perturb this general relationship. However, in general, the overall energy loss trend will approximate a smooth exponential relationship due to integration of the absorption effects over the travel distance. Any anomalously high (or low) absorption zone will perturb this smooth trend and will appear as an increase (or decrease) in the rate of energy loss with respect to the overall energy loss trend. Thus, the frequency content and bandwidth of the seismic energy with respect to depth in the earth, or length of propagation path, can be used in various embodiments of a method according to the invention to detect anomalous seismic energy absorption zones. In embodiments of a method according to the invention, anomalous absorption zones can be detected as a deviation from an overall energy absorption trend.

Figure 1:
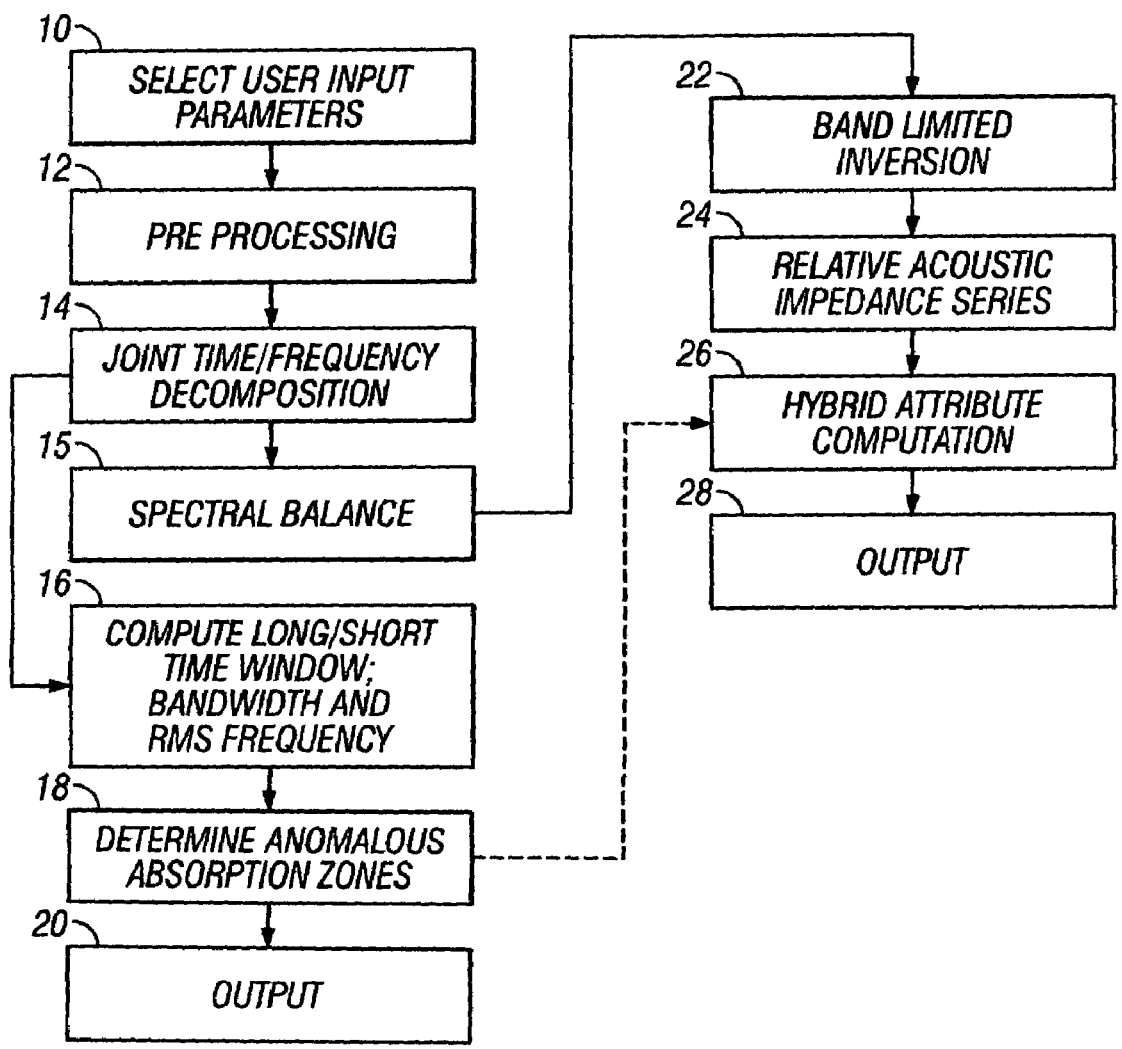
FIG. 1 shows a flow chart of example embodiments of a method according to the invention.

Seismic data may be processed in various embodiments of the invention by performing the procedures explained below on a number of individual seismic sensor data recordings or "traces." A trace represents a record, with respect to time, of seismic signals detected by a single sensor in an array of sensors for a single actuation of a seismic energy source. Referring to FIG. 1, at 10, user input parameters are selected, such as low and high frequency filter passbands for bandpass filters, a number of frequency bands, and upper and lower frequencies for the frequency bands for Gabor-Morlet decomposition. The low and high frequency bandpass filters will be further explained below. At 12, preprocessing, such as static correction, common depth point (CDP) stacking, or time migration may be performed on seismic traces to be processed according to the invention. An example of a seismic trace is shown at 30 in FIG. 2.

Returning to FIG. 1, at 14, a joint time-frequency decomposition is performed on selected seismic traces after preprocessing. Let S(t) represent the amplitude with respect to time of a seismic trace, let and E(t) represent its envelope. An example of a trace envelope is shown at 32 in FIG. 2. The envelope E(t) represents the energy amplitude in the trace with respect to time. In the present embodiment the seismic trace S(t) is decomposed into Gabor sub-bands using the Gabor-Morlet decomposition. See, for example, T. M. Taner, *Joint Time/Frequency Analysis, Q Quality Factor and Dispersion Computation Using Gabor-Morlet Wavelets or the Gabor-Morlet Transform*, Rock Solid Images, Houston, Tex. (2001). The Gabor-Morlet decomposition can be determined by the expression:

$$G(t, f) = \sum_{\tau} S(i - \tau) \cdot g(f, \tau) \tag{1}$$

where $$g(f,\tau) = e^{-i2\pi f \tau} \cdot e^{-\alpha(f)\tau^2} \tag{2}$$

Figure 2:
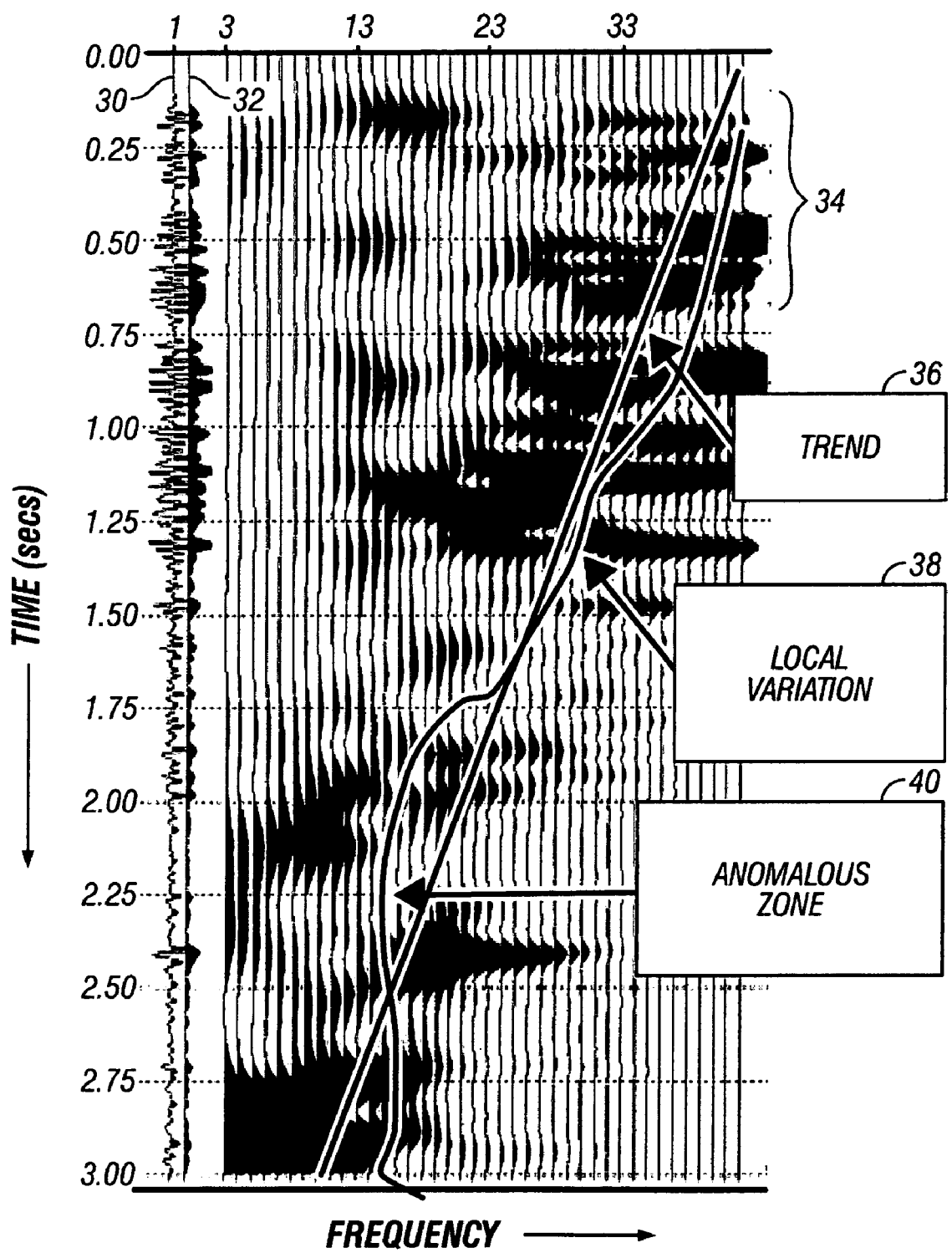
FIG. 2 shows an example of a seismic trace, a trace envelope, spectral decomposition and trend analysis according to one embodiment of the invention.

Because the output of the decomposition is a complex trace in each sub-band, then:

$$\alpha(f,t) = |G(f,t)| \tag{3}$$

where $\alpha(f, t)$ represents the joint time-amplitude spectrum of the seismic trace, t represents time and f represents frequency. An example plot showing amplitude of each frequency component (in each Gabor-Morlet sub-band) with respect to time is shown in FIG. 2 at 34. The plot is in the familiar "wiggle trace" format, wherein amplitude of the component is indicated by the size of the right-hand deflection of each sub band amplitude curve and area fill with respect to a selected reference level.

At 16, the bandwidth and the RMS frequency of the seismic traces are determined for each time sample, and filter passbands for a low frequency (long time window) and a high frequency (short time window) filter are determined. Determining the bandwidth and RMS frequency of the decomposed traces in the present embodiment includes determining the first and second moments of the joint time-frequency spectrum of each trace (determined by the decomposition as explained above). The first moment represents the mean value of the instantaneous frequency spectrum and can be calculated by the expression:

$$F_{ave}(t) = \frac{\sum_f f \cdot a(f, t)}{\sum_f a(f, t)} \quad (4)$$

The second moment represents the instantaneous RMS frequency and can be calculated by the expression:

$$F_{RMS}^2(t) = \frac{\sum_f f^2 \cdot a(f, t)}{\sum_f a(f, t)} \quad (5)$$

The difference of the squares of the second and first moments (see equation (6) below) is equal to the variance of the frequency spectrum of each trace at each time sample. For a Gaussian-distributed spectrum, the variance is equal to the square of half the bandwidth of the seismic energy. In general, therefore, the variance is proportional to the bandwidth. The variance can be determined by the expression:

$$\sigma^2(t) = F_{RMS}^2(t) - F_{ave}^2(t) \quad (6)$$

The bandwidth and RMS frequency calculations are instantaneous values for each time sample point and may contain local noise. In one embodiment, a general seismic energy loss trend is estimated using a weighted low pass filter of the variance (instead of actual bandwidth) and of the RMS frequency. Since both the bandwidth and RMS frequency generally decrease with respect to time, their product can be used rather than the individual bandwidth and RMS frequency values. Using the product of two values is equivalent to a logical "AND" condition, thus making the low pass filter more effective in reducing noise in the trend calculation. The low pass filter is preferably weighted using the trace envelope E(t). Weighting the filter using the trace envelope will provide more weight where there is high energy in each trace and lower weight where there is low energy in each trace. Envelope weighting of the filter is based on the assumption that any noise is in the background, generally in relatively low amplitude (and thus energy) zones, and therefore the effects of noise on the low pass filtered frequency and RMS frequency will be reduced if lower weight is given to low energy zones.

Let C(t) represent the product of RMS frequency and the bandwidth:

$$C(t) = 2 \cdot F_{RMS}(t) \cdot \sigma(t) \quad (7)$$

The envelope weighted filtered output, CW(t), which represents the general energy loss trend, wherein the filter operator is represented by W(τ), is given by the expression:

$$CW(t) = \frac{\sum_\tau E(t-\tau)C(t-\tau)W(\tau)}{\sum_\tau E(t-\tau)W(\tau)} \quad (8)$$

In one embodiment, a selected number of seismic traces are averaged prior to lows pass filtering to calculate the general trend. In one embodiment, in which seismic traces are acquired in three dimensions, traces along five in-line and five cross-line receiver steps (total of twenty five individual traces) are averaged prior to low pass filtering. An example of a general trend is shown at curve 36 in FIG. 2. One embodiment of bandpass filtering includes averaging the values of the bandwidth/RMS frequency product in a time window having a selected length. A typical filter length for the low frequency bandpass filter is about 800 milliseconds, although the actual value used will depend on the length (recorded time) of the traces and the frequency content of the traces. The output of the low frequency bandpass filter represents the general trend of bandwidth and RMS frequency of the seismic energy with respect to time.

Local variations of the RMS frequency and bandwidth are also computed by envelope weighted bandpass filtering, but using a higher frequency bandpass filter. Just as for the low frequency filter, the high frequency filter may be a time-averaging window, but of shorter time duration. A typical filter window length for the higher frequency bandpass filter is about equal to the seismic wavelet time. An example of a local trend curve is shown at 38 in FIG. 2.

Returning once again to FIG. 1, having bandpass filtered the decomposed traces, using both high frequency and low frequency filters, at 18, anomalous absorption zones may be determined as explained below. Let CL(t) and CS(t) represent the low-frequency and high-frequency bandpass filtered outputs, respectively. Then the difference between the general trend (the output of the low frequency bandpass filter) and the local variation (the output of the high frequency bandpass filter) is given by the expression:

$$AZ(t) = CS(t) - CL(t) \quad (9)$$

Zones having negative values zones of AZ(t) represent areas of lower frequency and narrower bandwidth than would be predicted by the general trend. Negative values of AZ(t) can be interpreted as an indication of anomalously high absorption zones. Such zones have been known to correspond to petroleum-bearing earth formations. An example of such as zone is shown at 40 in FIG. 2. Conversely, positive values of AZ(t) may be interpreted as anomalously low absorption zones. The values of AZ(t) may be output at 20 in FIG. 1 as an anomalous absorption zone indicator.

In a particular embodiment, hybrid seismic attributes can be determined Such hybrid attributes may include anomalously high absorption/low acoustic impedance zones; anomalously high absorption/high acoustic impedance zones; anomalously low absorption/low acoustic impedance zones; and anomalously low absorption/low acoustic impedance zones. To determine the foregoing hybrid seismic attributes, it is necessary to estimate the relative acoustic impedance of the various earth formations illuminated by the seismic energy during trace acquisition. Returning to FIG. 1, one embodiment of determining relative acoustic impedance from seismic traces includes, at 15, spectrally balancing the previously joint decomposed traces. In the present embodiment, spectral balancing includes determining for each time sample the envelope of the decomposed traces, and then matching the envelope of the decomposed trace to the envelope of the original trace at each time sample. Next, shown generally at 22 in FIG. 1, a relative acoustic impedance series is determined by "band limited inversion" of the spectrally decomposed traces, can be explained as follows.

Amplitude versus offset (AVO) computation techniques known in the art provides estimates of pressure wave, shear wave and pseudo-Poisson's reflectivity. All of these estimates are based on the Aki-Richards approximation of Zoepprits formulation of reflection amplitude and polarity variation with respect to incidence angle. The Aki-Richards approximation assumes that interfaces have gentle impedance contrast. For example, the pressure wave impedance contrast (reflectivity) is defined therein as;

$$R_p = \Delta v_p \rho / v_p \rho \qquad (10)$$

where;

$$\Delta v_p = v_{p,n+1} \rho_{n+1} - v_{p,n} \rho_n$$

$$v_p = (v_{p,n+1} \rho_{n+1} + v_{p,n} \rho_n)/2. \qquad (11)$$

It is desired to compute corresponding velocities, given a set of impedances. Since all of the impedances have same type of description, here we will omit the p to give a general expression. By substituting equation (11) back into equation (10) provides the expression:

$$R_{n+1} = 2(v_{n+1}\rho_{n+1} - v_n\rho_n)/(v_{n+1}\rho_{n+1} + v_n\rho_n) \qquad (12)$$

It is possible to solve equation (12) recursively. However, recursive solutions can be unstable, therefore they require extreme care in selection and control of scale factors of the input data. The exact scales, however, are not known. Equation (12) can be modified to include the unknown scale factor c:

$$c.R_{n+1} = 2(v_{n+1}\rho_{n+1} - v_n\rho_n)/(v_{n+1}\rho_{n+1} + v_n\rho_n) \qquad (13)$$

The subsequent layer velocity can be solved from the previous layer velocity as:

$$c.R_{n+1}(v_{n+1}\rho_{n+1} + v_n\rho_n) = 2(v_{n+1}\rho_{n+1} - v_n\rho_n) \qquad (14)$$

Combining like components provides the expression:

$$(c.R_{n+1} - 2)v_{n+1}\rho_{n+1} = -(c.R_{n+1} + 2)v_n\rho_n \qquad (15)$$

Finally, the recursive solution can be expressed as:

$$v_{n+1}\rho_{n+1} = v_n\rho_n \cdot (2 + c.R_{n+1})/(2 - c.R_{n+1}) \qquad (16)$$

It is necessary to determine the constant c that will keep the recursion stable. Computed results will be similar to the relative acoustic impedance, therefore the solution will represent medium length variation of the physical quantities (the actual acoustic impedances). Therefore, the results can be scaled according to their intended use. First, consider the scalar c that multiplies each output during the recursion:

$$r_{n+1} = (2 + c.R_{n+1})/(2 - c.R_{n+1}) \qquad (17)$$

This scalar is computed for each data sample and multiplies the present output value to estimate the next output value. The output values must be subject to some reasonable degree of variation. Equation (17) shows that c.R must be less than 2. Any value close to 2, however, will produce a very large scalar that will result in a very much larger result for the subsequent output value. This will lead to quick failure of the recursion. It is also the case that the impedance value (the product of velocity and density) is being computed, therefore the calculations must result in positive numbers. Therefore the r values must be positive. Also, the scalar r cannot be continuously less than 1.0, or more than 1.0. If r is continuously less than 1.0, then v will exponentially decay to very small values. If r is continuously larger than 1.0, the results will increase exponentially and instability will result in the recursion. Therefore, the r scalars will continuously vary around a mean value of 1.0. This suggests that a running mean of r can be set to 1.0 and the maximum deviation c.R is kept to less than 2.0 (more probably less than 1.0). It is known that in most cases RMS values of reflection coefficients are in a range of about 0.1 to 0.2. Values of reflection coefficient close to unity typically only occur at the surface of the water in marine seismic data, and even then only if water surface is substantially still. These observations provide a general set of limits for the scaling. Note that the acoustic impedances are being computed from seismic data that contain only band limited information. Therefore, very long wave and short wave impedances would have to be supplied by other measurements, such as well logs and normal moveout (NMO) related velocity measurements. However, even band limited, inversion does provide reasonable estimates of relative acoustic impedance of the various layers of earth formations. This is used in the present embodiment to enable determining hybrid attributes as will be explained below.

In the recursion procedure, the largest values of the scalars which produce stable results are selected. Then, any long wavelength trend is removed, typically with relative acoustic impedance computation.

From Fatti's approximation:

$$R(\theta) = \frac{1}{2}\left(\frac{\Delta I_p}{I_p}\right)(1 + \tan^2\theta) - 4\left(\frac{v_s}{v_p}\right)\left(\frac{\Delta I_s}{I_s}\right)\sin^2\theta, \qquad (19)$$

where θ represents the incidence angle, the quantities $\Delta I_p/I_p$ (the pressure wave impedance reflectivity) and $\Delta I_s/I_s$ (the shear wave impedance reflectivity) are estimated. Inversion of these reflectivity values will provide pressure and shear wave impedance estimates. If nearly constant or very slowly varying density is assumed, the inversion results can provide pressure and shear wave velocity estimates. Since these are estimated from band limited seismic data, velocity estimates will also be band limited. Longer wavelength portions may be supplemented by the NMO or migration velocities computed from the travel times. See, for example, Fatti, J. L., Vail, P. J., Smith, G. C., Strauss, P. J. and Levitt, P. R., 1994, *Detection of gas in sandstone reservoirs using AVO analysis*: A 3-D seismic case history using the geostack technique, Geophysics, 59, no. 09, 1362–1376.

By definition, pressure wave velocity is given by the expression:

$$v_p = \sqrt{(\lambda + 2\mu)/\rho} \qquad (20)$$

and the shear wave velocity is given by the expression;

$$v_s = \sqrt{\mu/\rho} \qquad (21)$$

where λ represents incompressibility, ρ represents density, μ represents rigidity, $I_p = v_p\rho$ represents pressure wave impedance, and $I_s = v_s\rho$ represents shear wave impedance.

By substituting these back into equations 20 and 21, the products of density with incompressibility and rigidity is provided as:

$$\lambda\rho = I_p^2 - 2I_s^2$$

$$\mu\rho = I_s^2 \qquad (22)$$

An output of the band limited inversion is a series of relative acoustic impedances (relative being defined as positive or negative with respect to a mean value). At 26 in FIG. 1, the hybrid attributes can be calculated as the product of the relative acoustic impedance values determined as explained above and the values of AZ(t) determined as explained above with respect to 16 and 18 in FIG. 1. The resulting products can be used to identify anomalously high absorption/low acoustic impedance zones; anomalously high absorption/high acoustic impedance zones; anomalously low absorption/low acoustic impedance zones; and anomalously low absorption/low acoustic impedance zones as previously explained.

Embodiments of a method according to the invention can provide a way to directly infer the presence of hydrocarbon productive zones from seismic data. Embodiments of a method according to the invention can also provide hybrid seismic attributes useful in the interpretation of seismic data.

Another aspect of the invention is related to computer programs stored in computer readable media. One embodiment of a program according to this aspect of the invention includes logic operable to cause a programmable computer to perform the elements of a method as explained above with respect to FIGS. 1 and 2. The computer readable medium may be, without limitation, a floppy disk, CD-ROM, hard drive, or any other computer readable storage device known in the art. Any general purpose programmable computer, such as a personal computer or work station may be programmed to implement methods according to the invention and as described above in the example embodiment of FIG. 1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing seismic data to detect anomalously absorptive zones, comprising:
   joint time-frequency decomposing seismic traces;
   low frequency bandpass filtering the decomposed traces to determine a general trend of mean frequency and bandwidth of the seismic traces; and
   high frequency bandpass filtering the decomposed traces to determine local variations in the mean frequency and bandwidth of the seismic traces, whereby anomalous zones are determined when the local variations deviate from the general trend.

2. The method of claim 1 wherein the decomposing comprises Gabor-Morlet decomposition.

3. The method of claim 1 wherein the low frequency bandpass filtering comprises averaging over a time window of about 800 milliseconds duration.

4. The method of claim 1 wherein the high frequency bandpass filtering comprise averaging over a time window having a duration about equal to a seismic wavelet time.

5. The method of claim 1 further comprising spectrally balancing the decomposed traces and inversion processing the spectrally balanced decomposed seismic traces to determine relative acoustic impedances.

6. The method of claim 5 further comprising determining hybrid attributes of the seismic traces from the low and high frequency bandpass filtered traces and the relative acoustic impedances.

7. The method of claim 6 wherein the hybrid attributes comprise:
   anomalously high absorption/low acoustic impedance zones;
   anomalously high absorption/high acoustic impedance zones;
   anomalously low absorption/low acoustic impedance zones;
   and anomalously low absorption/high acoustic impedance zones.

8. The method of claim 1 wherein at least one of the low frequency and high frequency bandpass filtering is weighted with respect to an envelope of the seismic traces.

9. The method of claim 1 wherein an anomalously high absorbing zone is identified when the local variation indicates bandwidth and RMS frequency lower than the bandwidth and the RMS frequency of the general trend.

10. The method of claim 1 further comprising averaging a selected number of decomposed traces prior to low pass filtering to determine the general trend.

11. A computer program stored in a computer readable medium, the program including logic operable to cause a programmable computer to perform steps comprising:
    joint time-frequency decomposing seismic traces;
    low frequency bandpass filtering the decomposed traces to determine a general trend of mean frequency and bandwidth of the seismic traces; and
    high frequency bandpass filtering the decomposed traces to determine local variations in the mean frequency and bandwidth of the seismic traces, whereby anomalously absorptive zones are determined when the local variations deviate from the general trend.

12. The program of claim 11 wherein the decomposing comprises Gabor-Morlet decomposition.

13. The program of claim 11 wherein the low frequency bandpass filtering comprises averaging over a time window of about 800 milliseconds duration.

14. The program of claim 11 wherein the high frequency bandpass filtering comprise averaging over a time window having a duration about equal to a seismic wavelet time.

15. The program of claim 11 further comprising logic operable to cause the computer to perform spectrally balancing the decomposed traces and inversion processing the spectrally balanced decomposed seismic traces to determine relative acoustic impedances.

16. The program of claim 15 further comprising logic operable to cause the computer to perform determining hybrid attributes of the seismic traces from the low and high frequency bandpass filtered traces and the relative acoustic impedances.

17. The program of claim 16 wherein the hybrid attributes comprise:
    anomalously high absorption/low acoustic impedance zones;
    anomalously high absorption/high acoustic impedance zones;
    anomalously low absorption/low acoustic impedance zones;
    and anomalously low absorption/high acoustic impedance zones.

18. The program of claim 11 wherein at least one of the low frequency and high frequency bandpass filtering is weighted with respect to an envelope of the seismic traces.

19. The program of claim 11 wherein an anomalously high absorbing zone is identified when the local variation indicates bandwidth and RMS frequency lower than the bandwidth and the RMS frequency of the trend.

20. The program of claim 11 further comprising logic operable to cause the computer to perform averaging a selected number of decomposed traces prior to low pass filtering to determine the general trend.

* * * * *